United States Patent [19]

Custor

[11] Patent Number: 4,462,852

[45] Date of Patent: Jul. 31, 1984

[54] PROCESS FOR COLORING (PRINTING) OF WEB-LIKE OBJECTS, ESPECIALLY SKI COVERINGS, AS WELL AS SIMILAR OBJECTS

[75] Inventor: Horst Custor, Traunstein, Fed. Rep. of Germany

[73] Assignee: C P Components GmbH, Traunreut, Fed. Rep. of Germany

[21] Appl. No.: 231,792

[22] Filed: Feb. 5, 1981

[30] Foreign Application Priority Data

Feb. 7, 1980 [DE] Fed. Rep. of Germany ....... 3004518

[51] Int. Cl.[3] ........................................... B29B 3/00

[52] U.S. Cl. ........................................ 156/231; 8/471; 101/470; 156/235; 156/244.16; 156/244.23; 156/246; 264/132; 264/171; 264/175

[58] Field of Search .................. 8/471, 470, 468, 467; 156/231, 230, 235, 237, 238, 240, 242, 277, 244.11, 244.16, 244.23, 246; 264/132, 135, 171, 175, 177 R, 241; 101/470

[56] References Cited

U.S. PATENT DOCUMENTS 4,202,663 5/1980 Haigh .................................... 8/471
4,314,814 2/1982 Deroode ............................... 8/471

*Primary Examiner*—William A. Powell
*Assistant Examiner*—Thomas Bokan
*Attorney, Agent, or Firm*—Andrus, Sceales, Starke & Sawall

[57] ABSTRACT

The invention refers to a process of coloring (printing) of track-like objects (2), especially ski coverings of thermoplastics, such as olefins, especially high and low pressure polyethylene where, the layer is brought continuously as a hot foil, essentially in a state of fusion, in contact with a print carrier (3), on which there has been deposited a print pattern first of sublimation type and then of diffusion type dye stuff. A transfer of the dye onto foil (2) occurs in a short time and only essentially along a small areal strip perpendicular to the common direction of conveying of layer (2) and print carrier (3). It is preferred that the transfer of dye occurs in the gap between rollers (5, 6) through which the foil and the print carrier are guided. This allows the obtainment of warpage-free print patterns on relatively thin-walled track-like objects in a continuous process, where it is assured that no warpages occur after cooling or reheating of the printed layer. Also, migration problems are avoided by means of short-term locally limited penetration under high pressure in the roller gap.

20 Claims, 6 Drawing Figures

PROCESS FOR COLORING (PRINTING) OF WEB-LIKE OBJECTS, ESPECIALLY SKI COVERINGS, AS WELL AS SIMILAR OBJECTS

BACKGROUND OF THE PRESENT INVENTION

The invention is about a process for coloring (printing) of web-like objects, especially ski coverings, from thermo-plastics such as olefins, especially high and low pressure polyethylene, where the side of the covering to be printed on is brought in contact with a print carrier where a fusion deposit is accomplished by means of heat, where the print carrier first has been covered with sublimation type color pigments and then with diffusion-type color pigments, as well as an apparatus for the implementation of such a process and of such a printed track-like object.

As is generally known, so called multiple layer skis have been manufactured for some time by glueing several layers together (see for example DE-OS No. 2 804 943) where these layers respectively form a lower, central, and upper structure.

The central structure generally consists of a wood or hard foam core, which is sideways pressed in with duroplastic synthetic resin;

The upper structure generally consists of an aluminum sheet and/or laminate of fiberglass reinforced plastic glued to the core, on which a plastic foil covering is applied, and which is decorated in subsequent working processes;

The lower structure on the other hand consists of an aluminum sheet or of a layer of fiberglass reinforced plastic, which is glued on one side to the core and which on the other side (possibly through several more layers) is glued with a proper runner layer, which normally is a transparent synthetic resin covering of 1–2 mm thickness and preferrably of polyethylene, namely high or low pressure polyethylene, or polytetrafluorethylene (Teflon, Trademark).

Normally the inner side of the runner layer (or also of the top covering) is printed, especially with a ski manufacturer, type designations, etc.; this printing is visible through the transparent layer or covering.

Until now, essentially only high and low pressure polyethylene ski coverings were used.

The decorations, especially the printing of such layers and further work processes has been done until now very expensively (see DE-OS No. 2 804 943) and still results often in bad quality:

It is done piecewise, that is not continuously or endlessly, namely through screen pressure (from patterns, lettering or the like) with epoxy pressure colors, where in addition the layer has to be treated before printing such as thermally (flame contact), electrically (Corona-discharge) or chemically (etching), since otherwise the (epoxy) print color would not adhere;

After the printing process a drying time of 10–20 hours is necessary after which the printed and dried layer is treated with an opaque (colored) epoxy-containing casting material (an opaque covering lacquer) including a hardener, in order to produce a background color layer for the transparent covering;

this casting material layer is then glued to a layer of fiberglass reinforced plastic, however only after several hours after which the solvent material has completely left the casting material which means after the mass has hardened.

In spite of this fabrication process, which is especially demanding, it has not been possible to secure a printing quality of good continuity on the completed ski.

The following deficiencies occur rather late, namely 3 to 10 months after manufacture of the ski:

insufficient adhesion preparation of the covering before printing;

Attack of the printed picture by the adhesive so that color tones are changing, the contours of the printed picture become diffuse or cracks develop in the printed arrangement;

insufficient elasticity of the casting material relative the covering or insufficient adhesion of the opaque casting material on the polyethylene of the covering so that the separation of the casting material manifests itself in the form of light spots on the runner side;

insufficient evaporation of the solvent from the opaque casting mass which causes adhesion deficiencies because of formation of bubbles between the casting mass and for example the polyethylene of the covering, thus producing bad looking light spots. Similar difficulties as with the runner covering occur when a corresponding top cover which is to be decorated is used as top covering layer.

These difficulties as of this day (inspite of at least 10 years experience) still pose a series problem, sincethe cause of the deficiencies has not been researched in detail, so that there results often claims from the ski buyer against the ski manufacturer.

Finally, the best obtainable printing to quality is very limited, in spite of all the effort, causing relatively costly structured printing patterns, that is, the printing of photographs with half tones is practically impossible.

The transfer printing process in accordance with DE-OS No. 2 642 350 is relatively demanding and very difficult to control, where the surface to be printed on is first covered with a thermoplastic synthetic resin layer such as polyurethane or polyester which can be printed without difficulty, this being done to avoid conveying by migration.

It is taught in DE-OS No. 2 731 121 to print on polyethylene by bringing the side of the form member to be printed on in contact with a print carrier such as paper print carrier, with applying heat to obtain a fusion deposit where there has been applied to the print carrier a printing pattern of a dye which transfers by sublimation and then diffusion. Preferred temperature 160°–220° C. is given. As a "sufficient" contact-pressure duration of the print carrier against the surface to be printed on, 5–30 seconds is suggested. However, under these conditions given in DE-OS No. 2 731 121 the same migration problems arise which one tries to avoid in accordance with DE-OS No. 2 642 350 by separately applying layers to the side to be printed on.

Obviously, the migration problems occur because of an excessively long contact pressure time under high heat whereas on the other hand a relatively high contact pressure is required to obtain sufficient penetration of the dye stuff into the form member.

When reworking the process as described in DE-OS No. 2 731 121, one finds that such great thermal stress (stress peaks) develop in the form member due to the fusion deposit of the surface to be printed on, which makes it impossible to print on relatively thin walls, for example track-like objects, especially ski laminations. An extreme stress decrease occurs in the area of the boundary line between the fused pressure side and the lower side which still is in a solid state, where the decrease of tension results in warpage of the printed layer during cooling.

Besides the warpage problem so far described, there occurs with "form free" printing of thin walled objects the problem that the paper print carrier when pressed on longer than one second becomes partly unremovable from the fused-on synthetic resin, when using thin paper print carriers as employed in the printing of textiles. The printed surface then is essentially unusuable.

Finally, it is another advantage of the known solution in accordance with DE-OS No. 2 731 121 that "an outer second heat application" is required for printing. The form member to be printed on must be fused on the pressure side by means of a heating plate or the like.

Therefore, the process known from DE-OS No. 2 731 121 because of reasons given above is not suited for coloring or printing of web-like objects, especially ski coverings.

SUMMARY OF THE PRESENT INVENTION

The object of this invention is a process and an apparatus of the above mentioned nature which guarantees sharpness of contour and warpage-free gloss prints where no warpage difficulties and no difficulties develop during the removing of a paper print carrier from the hot foil after the color transfer.

It is further the object of this invention to develop printed web-like objects, especially ski covering, from thermo-plastic, such as olefin and the like, whose print is free of warpage and which stand out because of good fixation of the print color and whose print side can be glued to a ski member or the like, perfectly and permanently.

The process of the given task is surprisingly accomplished with ease by the covering being altogether in the form of a hot foil essentially in state of fusion, a spot continuously in contact with the print carrier, with transfer of the color to the foil taking place over short time and then only essentially along a narrow area strip perpendicular to the common direction of conveyance of the layer and the print carrier.

The object to be printed on is thus in this invented process completely in a state of fusion so that a uniform crystallisation occurs over the cross section during cooling. No thermal stress can develop in the process of this invention.

Sticking of the print carrier is avoided even with high printing pressures by the shortness of time of the print transfer. This guarantees an intensive local penetration of the dyes into the layer or the hot foil. Surprisingly, no migration can be found. Furthermore, no synchronization problems between the hot foil and the print carrier, which would result in warpage problems, occur in the process of this invention, because of the short time of print transfer. Obtained are high gloss prints of highest quality where the half tones are retained without defect.

It is surprising that the above mentioned advantages are also obtained by printing on layers of high and low pressure polyethylene. Tests have shown that rather good print qualities are obtained when printing on a mixture of highest and high molecular polyethylene (molecular weight $6\times10^5$ and $2.5\times10^5$). The print dye at the printed areas is diffused inward, forming print patterns of sharp contour, so that an interference of the connection of adhesion by the print dye does not occur between the printed side of the layer and, for example, the upper or lower side of the ski body.

Preferably, a temperature controlled cooling of the printed foil occurs in a second process of longer duration. Through this step crystallisation through the entire thickness of the printed foil is enhanced. The thermally controlled cooling avoids especially the inclusion of thermal stress pockets which for example could form due to excessively fast cooling.

Surprisingly, the invention avoids fundamentally a preparation of the objects to be printed on to make possible the printing in the first place as it has become known until now regarding the printing of synthetic resin, for example, as the influence of electrical discharges, chemical agents (for example through etching) or the like:

For example, in a process for coloring, printing, and painting of form bodies of polyolefins and polymerized mixtures of olefins (see DE-PS No. 1 153 658) very special color dyes are deposited on the form body and which are, after the initial drying of the dye to the form body, heated to a temperature below the crystallite fusion point of the polymer, which per examples given is above 100° C. and which is active for 3–10 minutes. The application of special color dyes and the described process are to avoid an excessive "blooming, migration, and diffusion (bleeding)" of the color dyes. The difficulties during the printing of olefins are not only found in DE-PS No. 1 153 658 in the small vicinity of the colored dye for polyolefins, but they are also found in the strong migration (see column 1, lines 11, 12).

An especially advantageous apparatus for the implementation of the invented process is marked by a pair of rollers for the formation of a roller gap where one roller is partly wrapped by the foil and the other roller is partly wrapped by the print carrier, and drive arrangements for the two rollers for driving them essentially at the same circumferential speed.

The apparatus of the invention allows a short time contact between foil and print carrier in a continuous process where the contacting only occurs along a narrow areal strip perpendicular to the common direction of conveying of the layer and the print carrier through between the two rollers.

Further advantageous embodiments of the invention are described in more detail in the following sub-claims whose teachings have proven themselves superbly in practice.

The teaching in accordance with claim 12 advances a print pattern on the foil with sharp contours and free of warpage, by avoiding a possible small existing rotation of the fused matter in the reservoir zone in the roller gap (especially in the case of larger differences in the diameters of the two rollers). A relative motion of 0 magnitude is guaranteed between dye stuff and fusion elements. The teaching in accordance with claims 14 and 15 is especially advantageous to avoid tearing, warpage or crumbling of the print carrier, while it passes through the fusion matter reservoir. Especially in accordance with teaching per claim 16 no dislodging of the print carrier relative to the conveying means can occur which also assures one of zero relative speed between the hot foil (especially extruded fusion layer) and print carrier, that is their synchronous speed.

Through the teaching in accordance with claim 11 the strength of color of the printing (force of color) is further increased or a better color contrast is obtained. In addition, this overpasting or glueing allows an insignificant passage of print color from the layer (foil) into the adhesive and/or the reinforcing means, which, however, even fixes deeper the print pattern in the completed binding element.

Regarding the special advantages obtaind from the teaching pertaining to the apparatus, it is essentially referred to the corresponding process claims.

The embodiment of claims 2 and 9 allows post-printing on completed (cold) foils where for reasons of expediency the heated pressure rollers are used simultaneously for contact of the foil and the print carrier as well as tempering of the foil.

BRIEF DESCRIPTION OF THE DRAWING FIGURES

By means of the drawings the invention is further explained.

Shown is:

FIG. 1: A schematic of a first example of embodiment of an apparatus for the implementation of the invented process;

FIG. 2: A section of FIG. 1 with pertinent diagrams and parameters for explaining the invented process.

FIG. 3: Detail of a version of the apparatus from FIG. 1;

FIG. 4: a further version of the apparatus of FIG. 1;

FIG. 5: a third version of the apparatus of FIG. 1; and

FIG. 6: a fundamentally different embodiment of the invented apparatus.

DESCRIPTION OF THE ILLUSTRATED EMBODIMENT

Figure 1:
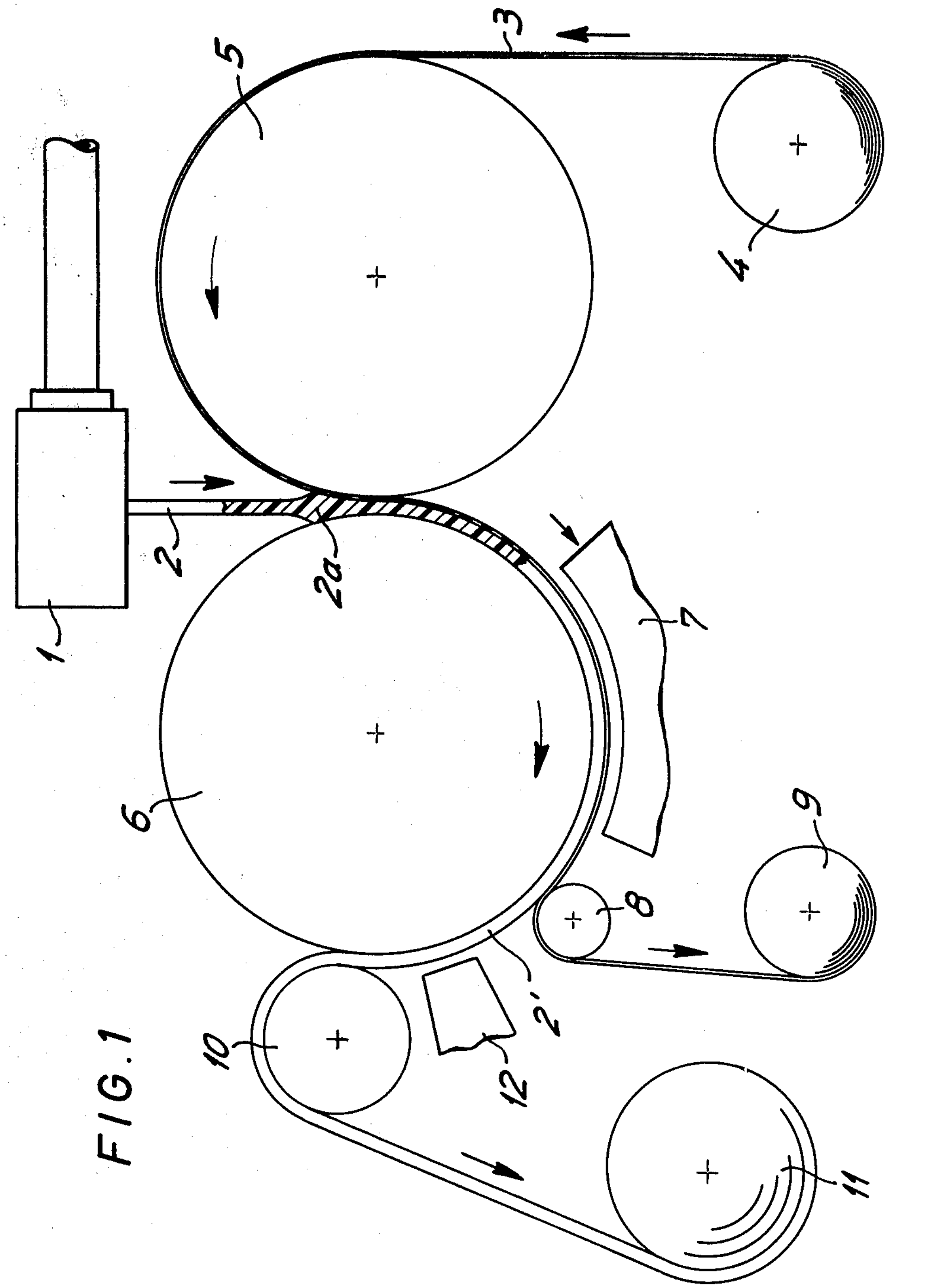

FIG. 1:

From extrusion tool 1 issues a foil 2 of thermoplastic synthetic resin in form of a fusion sheet. An assistant print carrier 3 is rolled off a supply roller 4 and a conveying roller 5 to a roller gap formed by heated roller 6 in which it is brought in contact with foil 2 in form of a fusion sheet. The roller gap is sized in such a way (see for more detail FIG. 2) that a wedge-shaped reservoir **2*a* is formed as can be plainly seen from FIG. 1. In reservoir zone 2*a*** the beginning of the contact occurs as already described in detail in the introduction.

After exit of foil 2 with the assist print carrier 3 from the roller gap between the two rollers 5 and 6 a second stage is immediately adjacent, which also has already been explained in detail, in which foil 2 and the assist print carrier 3 together run over a relatively large circumferential angle of roller 6 namely in a tempering arrangement 7, with controlled reduction of temperature from the roller gap in the direction of motion until the assistant print carrier has its print pattern exhausted and is removed over a turn-around roller 8 to a storage roller 9.

The printed foil 2′ preferrably then is moved past a post treatment apparatus 12 which acts in the form of a high frequency Corona discharge or non-oxidizing flaming. Subsequently the printed foil 2′ is wound on storage roller 11 after passing over a turn-around roller 10, to be further processed later on.

Although rollers 5, 6 are shown with essentially the same diameter, it is understood that their diameter can be absolutely different; for example, the roller 5 can have a considerably smaller diameter than roller 6.

The temperature arrangement 7, which is shown only schematically, can, for example, be formed by a cool air channel where the cooling air can be introduced at the end indentified by an arrow.

The post treatment arrangement 12 has its own fundamental structure.

In the example of the embodiment FIG. 1 the print carrier is a so called assistant print carrier 3, in that after giving of its print pattern to the print-receiving foil 2, it is removed from contacting foil 2, namely over turn-around roller 8 to the storage roller 9, as already explained. However, it is also possible to let the print carrier 3 form a permanent bond with foil 2, if, for example, print carrier 3 has to perform further functions. In this case the turn-around roller 8 and the storage roller 9 would be deleted in FIG. 1.

Figure 2:
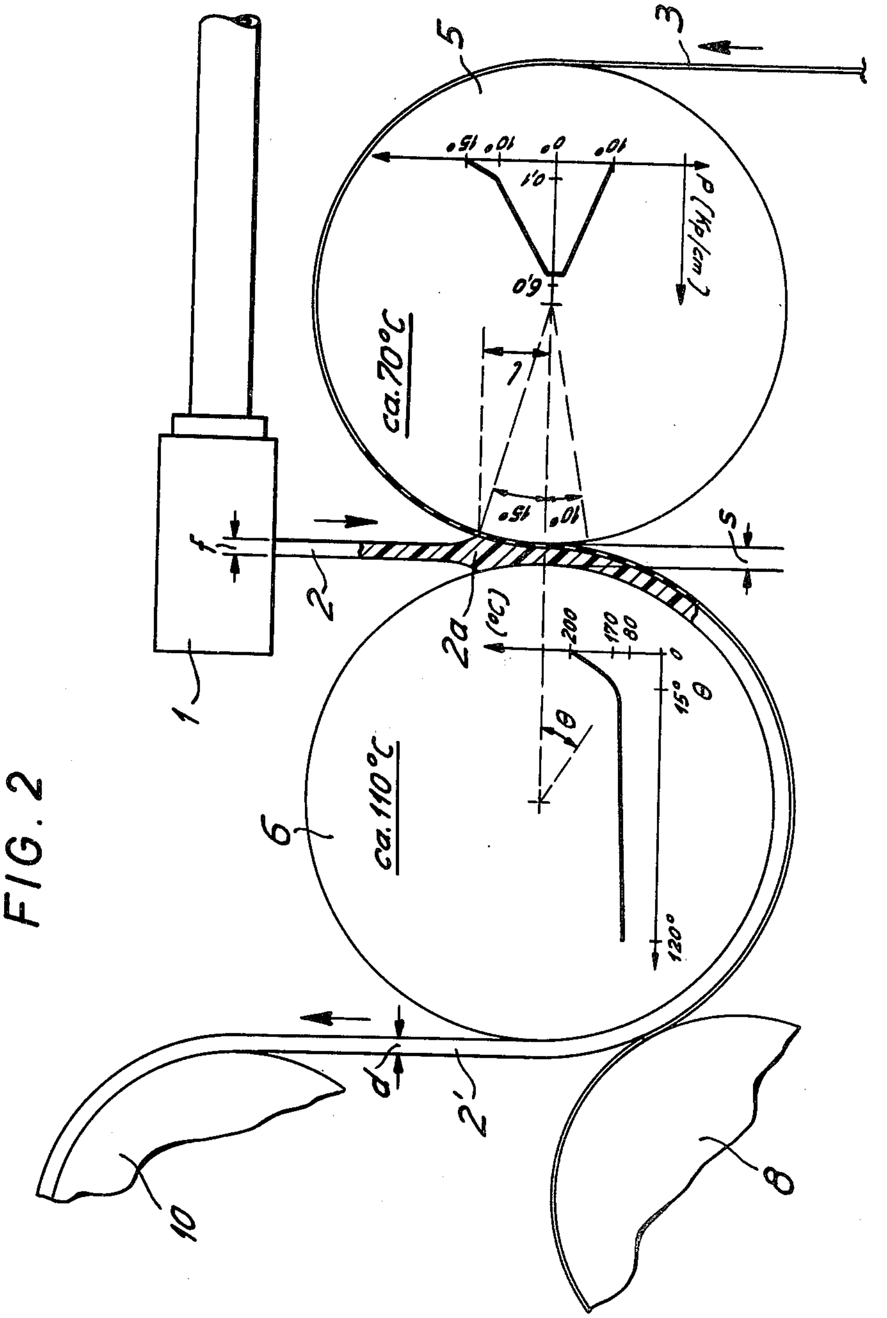

FIG. 2:

The preferred embodiment of the invention for a print-receiving polyethylene foil is shown in FIG. 2 in more detail as now will be explained.

Figure 3:
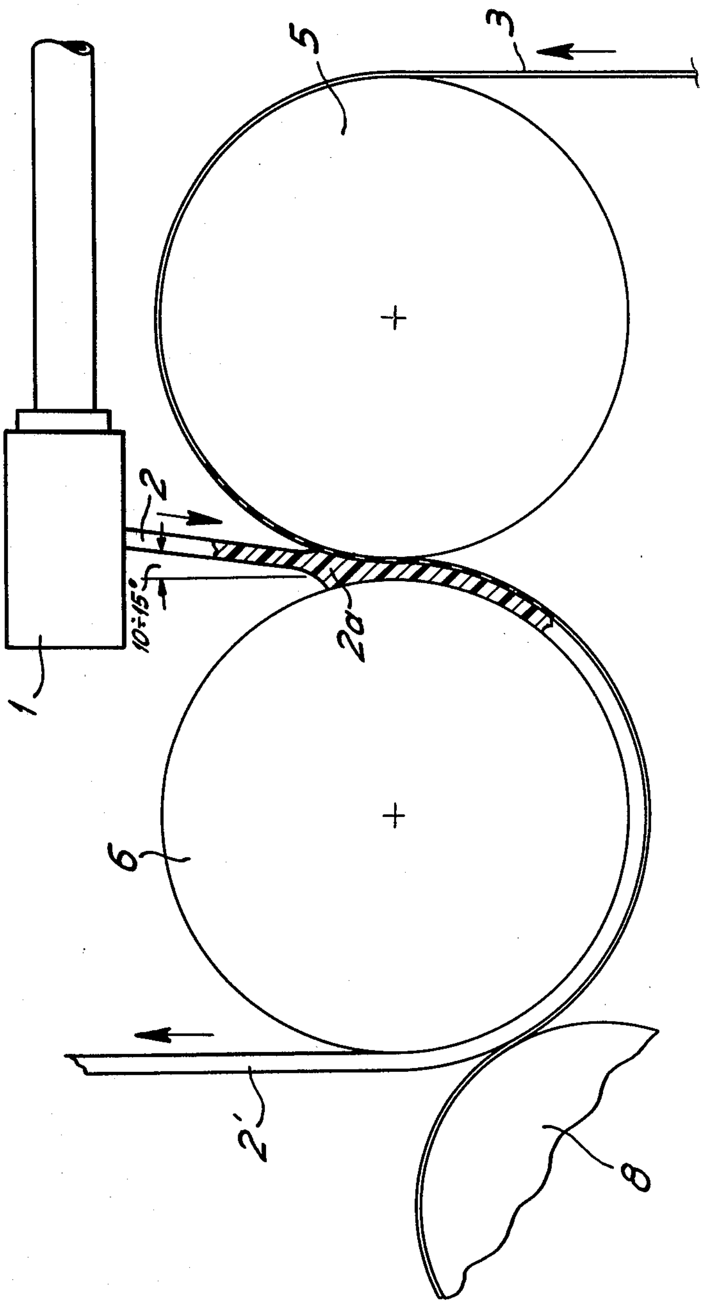

The symbols used in FIG. 3 have the following meaning:

f = Opening width of extrusion tool 1, s = Width of roller gap (at the narrowest location) between roller 5 and 6, l = Length of roller gap between roller 5 and 6 d = Thickness of foil 2.

As evidenced in FIG. 2, the roller length 1 accurately should be understood as the length of the reservoir zone **2*a*, namely on one hand between the first incidence of contact of foil 2 in direction of conveyance (see arrow) on circumference of rollers 5 and 6, and on the other hand the most narrow location of the roller gap corresponding to roller gap width s (see FIG. 2 the two dotted lines which border double arrow 1**).

The following relationships exist among the individual magnitudes:

$s=d$ $f=(1.0\div 1.2)\times s$ $l=(1\div 10)\times s$ p identifies the line-pressure over the circumference of rollers 5 and 6. The relationship between the thickness of foil 2 and the width of the roller gap is not critical and the effect of the thickness of the print carrier need not be considered for purposes of calculation and analysis.

The temperature distribution of foil 2 over the circumference of roller 6 is seen from the corresponding diagram "foil temperature" in FIG. 2. This temperature distribution is determined by the fact that foil 2 which issues from extrusion tool 1 at a high temperature, namely with approx. 225° C. for high molecular polyethelene, cools off upon exit from the roller gap, in spite of heat transfer from rollers 5 and 6, which (for example by means of oil recirculation heating) are heated to temperatures for example of approx. 70° C. and 110° C. respectively.

It can be seen from FIG. 2 that the first instance of contact occurs in the vicinity of the roller gap, as it is formed by circumferential arcs of 15° and 10° (see the graphical representation within roller 5) since there the required high pressure (more accurately: line pressure P due to the in-contact-bringing of the invention of foil 2 and pressure carrier 3 in a strip-shaped, that is in an essentially linear zone), and the necessary high temperature exists (also see the foil temperature curve within roller 6 with high values in circumferential arc from 0°–15° after the most narrow position of the roller gap).

After that the pressure adjustment is not critical.

Application of tempering arrangement 7, which for example, can be formed by means of a warm air channel or through infrared radiators, is recommended for adjustment of the temperature distribution of foil 2 in the second stage of the in-contact-bringing process, so that the foil with the printed-on pattern during its cooling is temperature controlled in such a fashion from thermo-elastic to solid state, that no warpage of the foil or the printed pattern occurs.

The rotational speed, that is the circumferential speed of the two rollers 5 and 6, should be adjusted in such a way that zero relative velocity between foil 2 and the print carrier 3 results and therefore a clean print is obtained.

FIG. 3:

The arrangement of the extrusion tool 1 with its opening relative to the roller gap between rollers 5 and 6 is such that the angle of introduction of foil 2 is approx. 10°–15° relative to the center line of the roller gap, that is in the direction to the conveying roller 5 of the assistant print carrier 3.

This measure results in the advantages described in the background of the present invention.

FIG. 4:

In this embodiment of the invention additional provisions are made relative the example of the embodiment of FIG. 1:

a disc or band brake of known construction with shaft 13, a disc 14 and brake shoes 15 as well as brake lining 5 *a* on conveyor roller 5 of print carrier 3 is used for tension control and a pre-heat arrangement 16 for pre-heating of print carrier 3 to approx. 50°–70° C.

Figure 4:
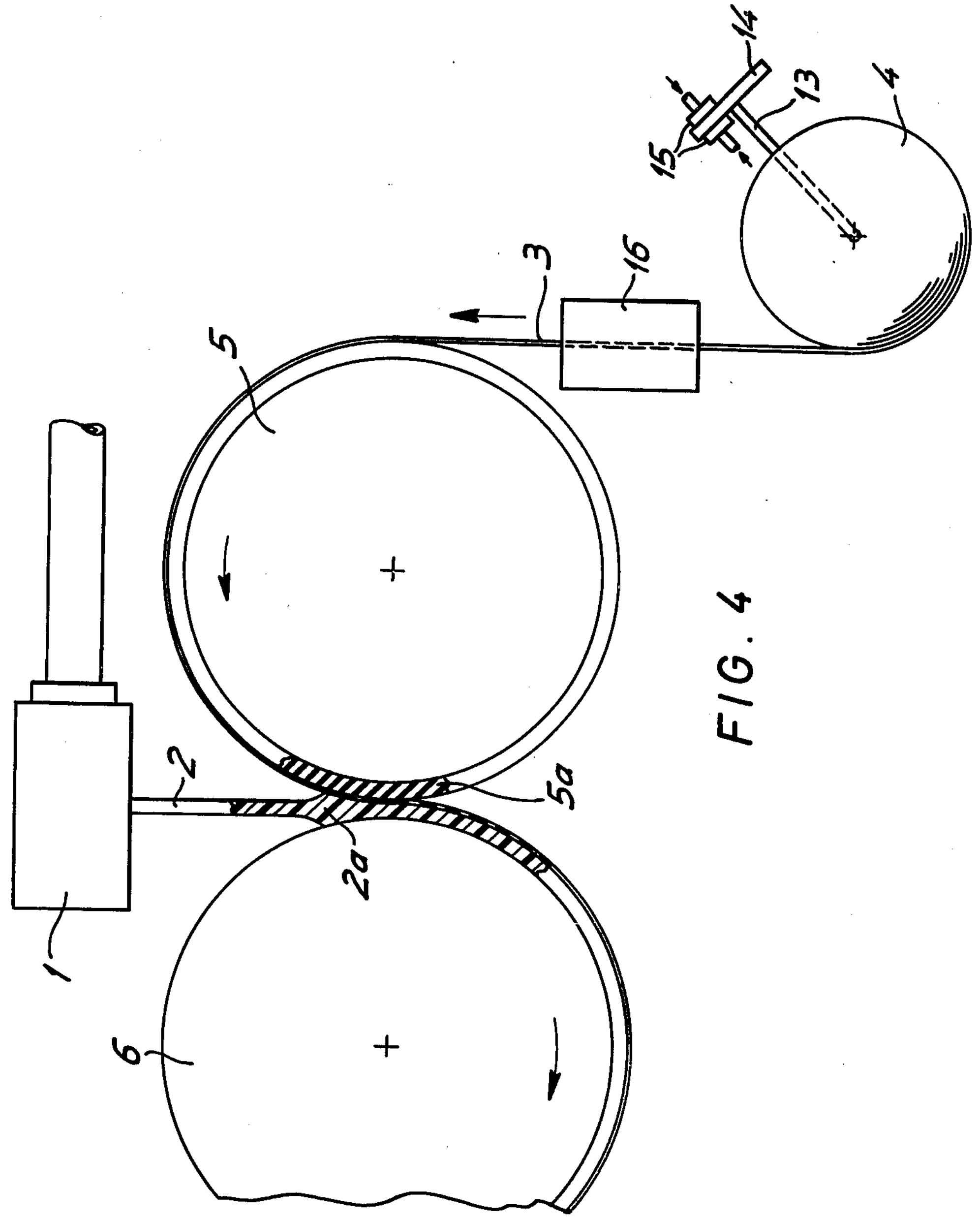
Figure 5:
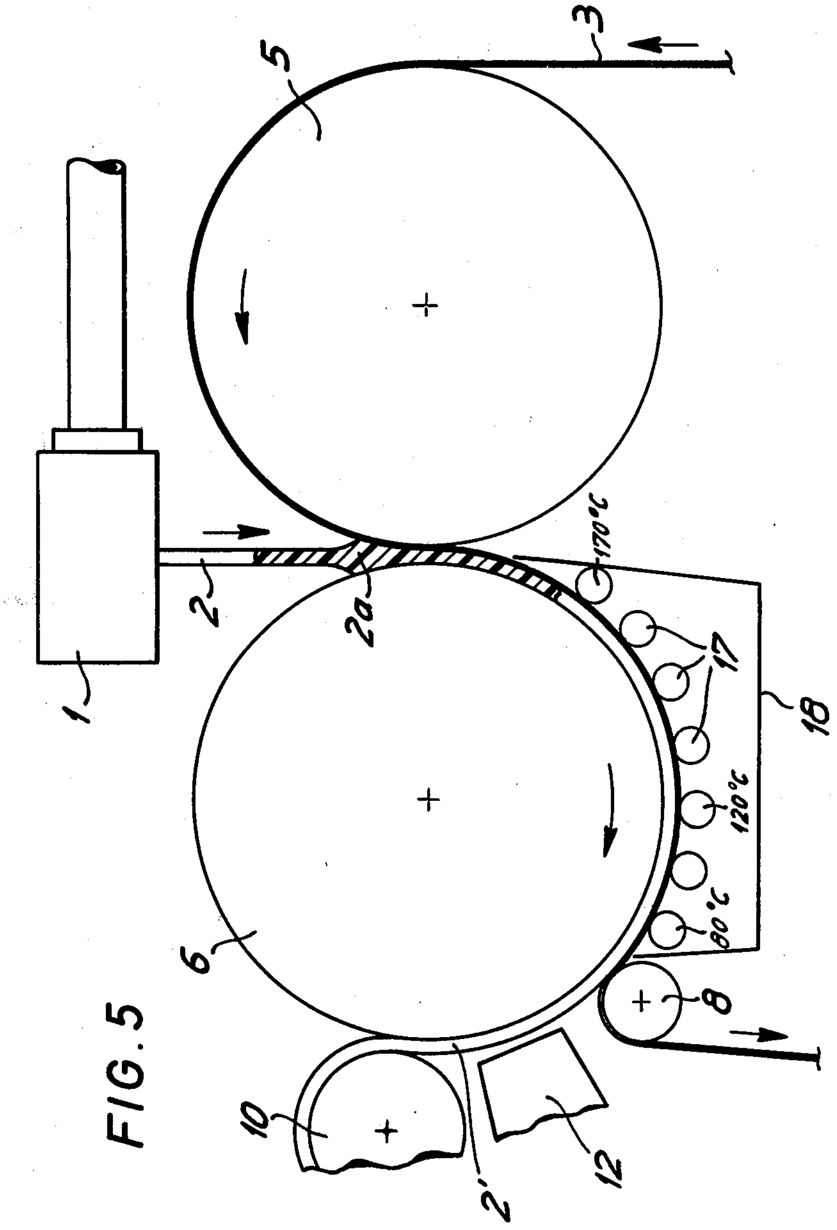

Here too, it is referred to the background of the present invention because of the example of embodiment of FIG. 4.

FIG. 5:

Here a pressure arrangement is intended for an improved in-contact-bringing, that is holding of foil 2 and print carrier 3 in the second stage, the pressure arrangement being formed by pressure rollers 17 to which is added a tempering arrangement in the form of a hot air channel 18 so that the indicated temperature decrease in the direction of conveying results in reference to several pressure rollers 17.

FIG. 6:

This embodiment is fundamentally different compared to FIG. 1 in that foil 22 is not set from an extrusion tool but rather that it is unreeled initially from supply roller 21*a* in a cold state and then reaches over turn-around roller 24*a* a pre-heat roller 26 where the foil is heated above its crystallite melting point, that is finally after passing another turn around roller 27, enters the roller gap formed by two embossing rollers 35, and 36 while simultaneously a print carrier 23 is led into the roller gap where the print carrier has been unreeled from a supply roller 21 *b* over turn around roller 24*b* and a preheat roller 25 which preheats to approx. 50°–70° C.

Figure 6:
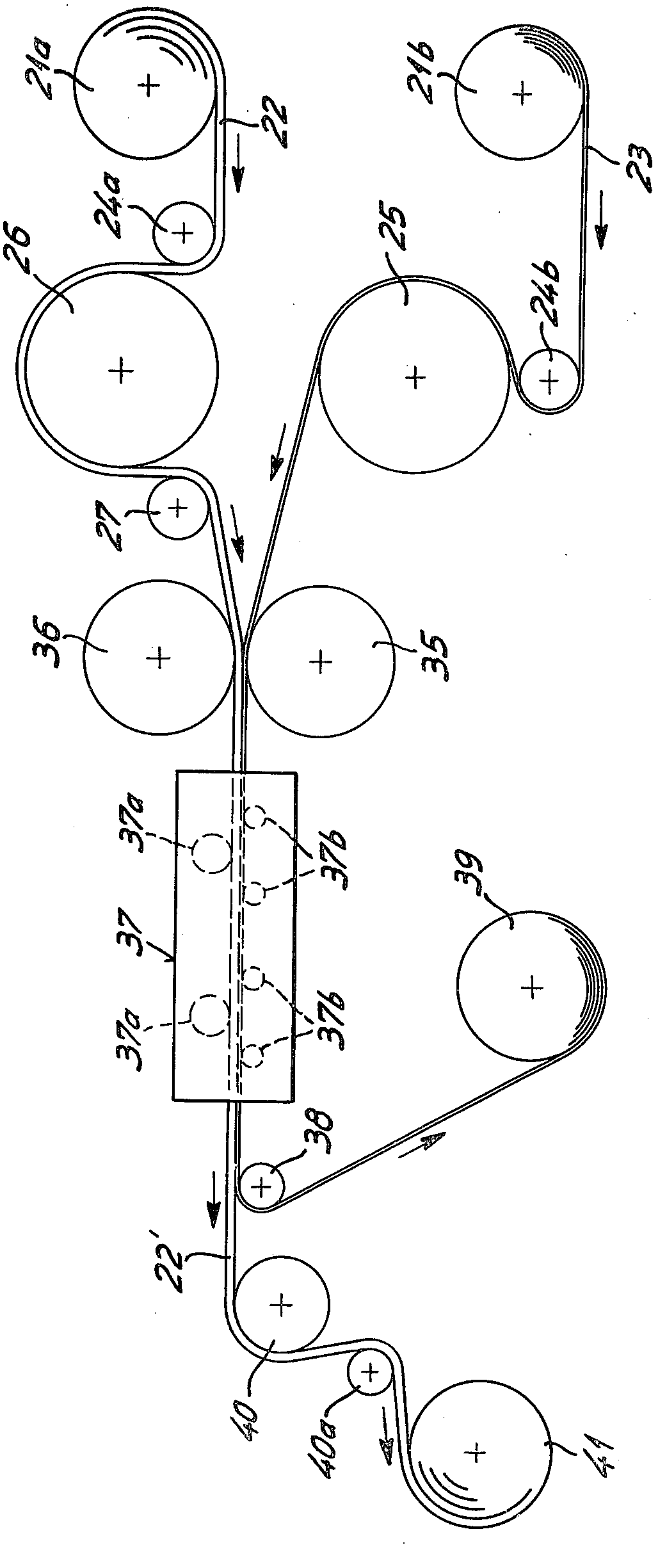

The first in-contact-bringing between foil and print carrier occurs in the gap formed by the two glazing rollers 35 and 36. Subsequently, foil and print carrier run through a pressure arrangement 37 where preferably tempering occurs through pressure rollers 37*a* and 37*b* by heating them accordingly, while the pressure rollers to the left in FIG. 6 have a lower temperature than those on the right side of FIG. 6.

The print-exhausted print carrier 23 is stored on a storage role 39 by means of a turn-around roller 38, whereas printed foil 22′ is stored on storage roller 41 by means of turn-around roller 40 and 40*a*.

This example of the embodiment makes it possible to print on a foil which has been produced previously.

Regarding formation of the roller gap between the two glazing rollers 35 and 36 preferably similar considerations apply as in regard to the above FIG. 2, except that here the foil thickness d is used in place of extrusion tool opening width f.

Implementation of the invented process may use a known double-band press such as manufactured and sold by FA. Sandvik Conveyor GMBH, Salierstrasse 38, 7012 Fellbach B. Stuttgart, West Germany. The press is a known apparatus and includes a starting pressure arrangement for heat treatment, as along as high values of pressure and temperature are set in its direction of conveyance through the first stage. the press provides implementation of the first stage of the new process and the bringing of the foil and print carrier into proper contact.

In addition, roller 6 or the glazing roller 36 can be equipped with a profile, to accomplish simultaneously with printing of foil 2 or 22 an additional embossing of the foil later to be used as a layer, for example, when the layer is to be equipped with scales for long distance ski racing.

I claim:

1. A process for printing of web objects especially ski coverings from thermo-plastics, such as olefins including high and low pressure polyethylene wherein the side of the covering to be printed is subjected to heat to obtain fusion of the printing from a printing carrier which has been covered with a printing pattern of a color pigment adapted to transfer under the influence of heat from the carrier to the web object and as a result first of sublimation and then of diffusion, comprising moving an elongated print carrier along a predetermined path, moving a web object adapted to form a hard foil and with said object in a state of melt continuously into contact with said print carrier and essentially along a narrow area strip perpendicular to the common direction of the conveying of the web object and the print carrier, and including rapidly transferring of the printing unto said object in said state of melt by sublimation and then by diffusion along said narrow area strip.

2. The process in accordance with claim 1, characterized by a another process step comprising applying a control cooling means to the printed foil for cooling said foil, said cooling step being of a longer time duration than said transfer period.

3. In the process according to claim 1 or 2 wherein said rapid transfer of color includes passing the printing material through a slot converging in the direction of conveyance which in combination with the conveying velocity of the foil and the color carrier is constructed and arranged to generate an essentially wedge-shaped and rotation-free reservoir zone of the foil in said melt state.

4. In the process in accordance with claim 1 or 2 including the step of extruding said web object and wherein the printing step is created immediately following the extrusion of the web object.

5. The process in accordance with claim 2 including the step of supplying a cold foil, heating said cold foil to said state of melt and then printing on said heated foil.

6. The process in accordance with claim 1 including the use of printing pigments which are light-stable pigments on said carrier.

7. The process in accordance with claims 1 or 2, characterized by the fact that said print carrier is selected from a printed paper metal such as aluminum, fleece web or like material.

8. The process in accordance with claims 1 or 2 wherein the transfer of said printing is completed in approximately 1 second, and including heating said foil and carriers at a temperature of 180–250 degree C. during said transferring and applying an increasing pressure in the direction of movement of said foil and carrier.

9. The process in accordance with claim 2, including heating the foil to approximately 200–250 degree C. wherein said cooling step is held for 10–15 seconds and decreasing the temperature applied to the foil and carrier from approximately 200–250 degree C. to approximately 50–90 degree C.

10. The process in accordance with claim 8 wherein said foil and said carrier are moved to form a melting-reservoir zone with a line pressure (P) increasing steeply over the length (l) from approximately 5-fold extrusion-tool-opening width (f) (or foil thickness (d)) from approximately 1–60N/cm.

11. The process in accordance with claim 1 wherein a roller for the foil and a conveying roller for the print carrier are constructed and arranged to define a gap which converges in the direction of conveyance to which the foil melt is introduced.

12. The process in accordance with claim 11 including introducing the foil melt in an angle of approximately 10–15 degree relative to the center-line of the roller gap in the direction of the conveying roller for the print carrier.

13. The process in accordance with claim 11 including the step of heating the conveying roller of the foil to a temperature of approximately 110 degree C and the conveying roller of the print carrier to a temperature of approximately 70 degree C.

14. The process in accordance with claim 1 including the step of preheating the print carrier.

15. The process in accordance with claim 1 including conveying the print carrier by a rough surface roller.

16. The process of claim 1 including forming a covering having scales on the side opposite said printing.

17. The process of claim 1 including passing warm air over the printed foil to cool the foil.

18. The process in accordance with claim 1 including treating of the printed foil by a high frequency Corona discharge or non-oxidizing flame contact.

19. The process in accordance with claim 1 including forming the printed foil on a reinforcing material such as a light color plastic reinforced with glass fiber and adhesively attaching the foil to the reinforcing material using transparent or light colored adhesive, preferably polyurethane adhesive.

20. The process in accordance with claim 19 including the step of heating the foil and material.

* * * * *